(12) United States Patent
Hessell et al.

(10) Patent No.: US 7,051,856 B2
(45) Date of Patent: May 30, 2006

(54) METHOD AND APPARATUS FOR APPLYING AND RELEASING A CLUTCH

(75) Inventors: Joseph Hessell, Canton, MI (US); Michael J. Gorman, Pinckney, MI (US)

(73) Assignee: General Motors Corporation, Detroit, MI (US)

( * ) Notice: Subject to any disclaimer, the term of this patent is extended or adjusted under 35 U.S.C. 154(b) by 55 days.

(21) Appl. No.: 10/700,419

(22) Filed: Nov. 4, 2003

(65) Prior Publication Data

US 2005/0092576 A1 May 5, 2005

(51) Int. Cl.
*B60W 10/02* (2006.01)

(52) U.S. Cl. .............................. 192/85 AA; 192/109 F
(58) Field of Classification Search .............. 192/3.57, 192/85 R, 85 AA, 85 CA, 86, 88 A, 109 F
See application file for complete search history.

(56) References Cited

U.S. PATENT DOCUMENTS

| | | | | |
|---|---|---|---|---|
| 3,683,618 A | * | 8/1972 | Schacher et al. ............. 60/494 |
| 3,985,063 A | * | 10/1976 | Lemon .................... 192/109 F |
| 4,265,346 A | * | 5/1981 | Emmadi .................. 192/109 F |
| 4,349,094 A | * | 9/1982 | Pavesi .................... 192/109 F |
| 4,465,168 A | * | 8/1984 | Sato ......................... 192/3.57 |
| 4,653,350 A | | 3/1987 | Downs et al. ................ 74/864 |
| 5,105,929 A | * | 4/1992 | Schmid et al. ............ 192/12 C |
| 5,307,727 A | * | 5/1994 | Berger et al. .................. 91/29 |
| 5,924,539 A | * | 7/1999 | Braun et al. ............. 192/109 F |
| 6,258,010 B1 | | 7/2001 | Bai et al. ..................... 477/143 |
| 6,292,732 B1 | | 9/2001 | Steinmetz et al. ............ 701/67 |
| 6,443,277 B1 | | 9/2002 | Taylor et al. .............. 192/3.57 |

\* cited by examiner

*Primary Examiner*—Saul Rodriguez
(74) *Attorney, Agent, or Firm*—Christopher DeVries

(57) ABSTRACT

An apparatus for applying and releasing a clutch piston in a clutch cylinder against a return spring includes a fill oil chamber having first and second portions separated by a fill piston. The first portion is in fluid communication with the clutch cylinder through a first passage, and the second portion is in fluid communication with a second passage. A third passage is in fluid communication with the first passage. A fill control valve is operative to alternately communicate the second passage to a transmission line pressure passage or an exhaust passage. The fill control valve is further operative to alternately communicate the third passage to a controllable source of pressurized oil having a signal pressure, or to close the third passage.

9 Claims, 4 Drawing Sheets

METHOD AND APPARATUS FOR APPLYING AND RELEASING A CLUTCH

TECHNICAL FIELD

The present invention relates to a method and apparatus for applying and releasing a clutch piston in a clutch cylinder wherein pressure control is switched between a transmission line pressure and a controllable signal pressure.

BACKGROUND OF THE INVENTION

In automatic transmissions, clutches are typically applied by the application of pressurized fluid to a clutch cylinder which causes movement of a clutch piston against a clutch pack to compress and engage the clutch pack. The pressure rise profile for the fluid used in applying the piston is typically controlled by an accumulator and spring, which results in a smooth, first order curve in the force application.

Another method of controlling the pressure rise profile is direct electronic pressure control of the clutch, wherein a pulse width controlled solenoid valve is used in connection with the accumulator and spring to control the pressure by dithering between exhaust and supply passage connections to control the pressure.

These prior art systems typically compromise between a high flow rate which provides a quick response time but poor fine control of the pressure, and a lower flow rate which results in greater fine control of pressure but lengthened response time.

Ideally, it is desirable to stroke the piston quickly while also allowing an accurately controlled, smooth pressure rise when the clutch plates are being engaged, held and released.

SUMMARY OF THE INVENTION

The present invention provides an apparatus and method for applying and releasing a clutch piston wherein pressure control is alternated between transmission line pressure and a controllable signal pressure to provide fast fill capability without compromise to fine pressure control capability.

More specifically, the invention provides an apparatus for applying and releasing a clutch piston in a clutch cylinder against a return spring. The apparatus includes a fill oil chamber having first and second portions separated by a fill piston. The first portion is in fluid communication with the clutch cylinder through a first passage, and the second portion is in fluid communication with a second passage. A third passage is in fluid communication with the first passage. A fill control switching valve is operative to alternately communicate the second passage to a transmission line pressure passage or an exhaust passage, and further operative to alternately communicate the third passage to a controllable source of pressurized oil having a signal pressure or to close the third passage.

Preferably, the fill control valve is a double spool valve biased by a spring. The third passage is connected to the first passage through an orifice.

The fill oil chamber is positioned below the lowest sump level of the transmission in which the apparatus is positioned. Preferably, a snubber is formed in the fill oil chamber to cushion movement of the clutch piston when applying the clutch piston.

The apparatus is operative to switch between application of line pressure or signal pressure to the clutch piston to cause a rapid, controlled application and release of the clutch piston.

Another aspect of the invention provides a method for applying and releasing a clutch piston in a clutch cylinder. The method includes: (A) providing a source of transmission line pressure; (B) providing a controllable source of pressurized oil having a signal pressure; and (C) alternately communicating the clutch cylinder with the source of transmission line pressure and the controllable source of pressurized oil to control application and release of the clutch piston.

The above features and advantages, and other features and advantages of the present invention are readily apparent from the following detailed description of the best mode for carrying out the invention when taken in connection with the accompanying drawings.

DESCRIPTION OF THE PREFERRED EMBODIMENTS

Figure 1:
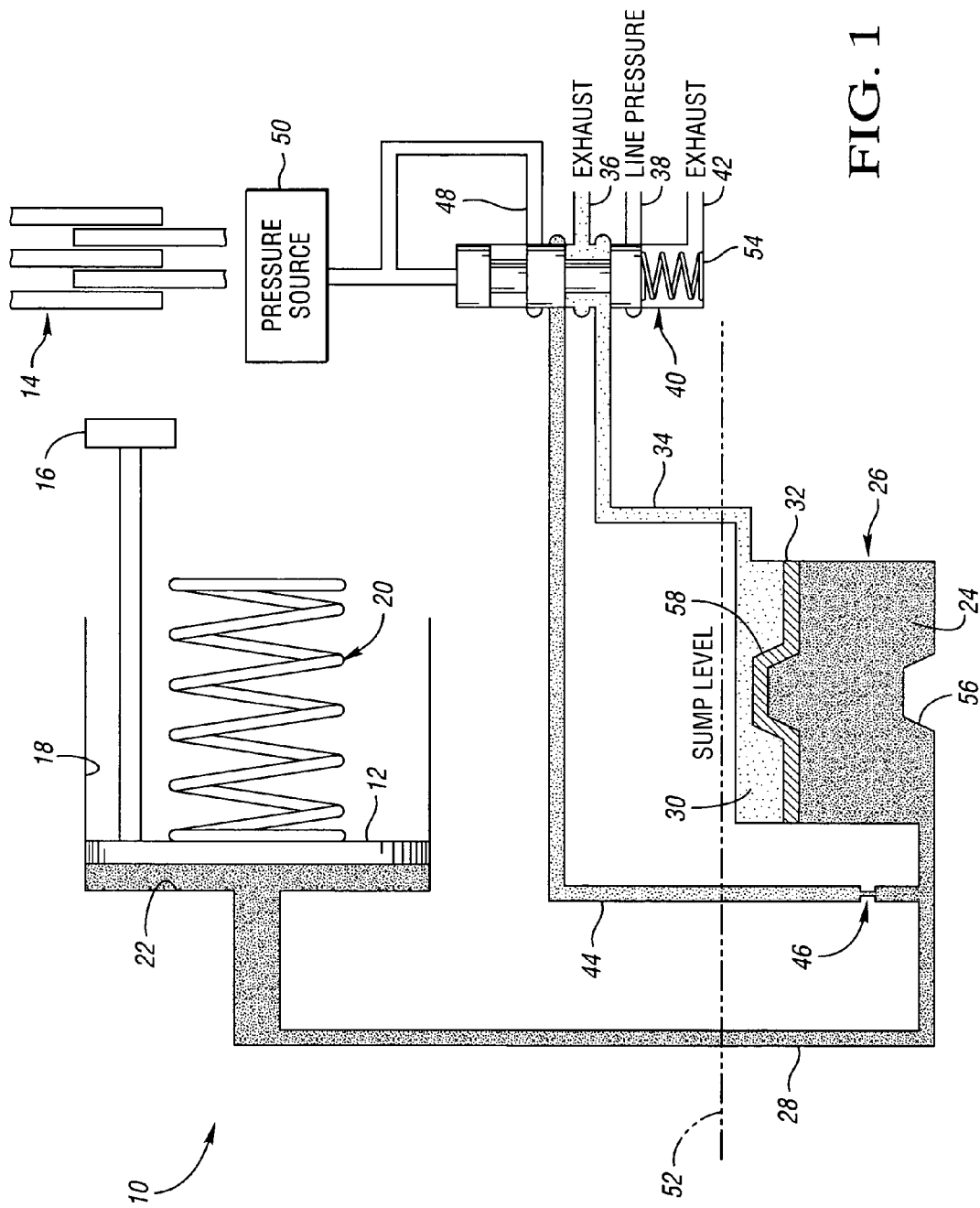
FIG. 1 is a schematic illustration of a clutch control apparatus in accordance with the invention, wherein the clutch is in an idle mode.

FIG. 1 shows a schematic illustration of a clutch apparatus 10 for an automatic transmission. The clutch apparatus 10 controls movement of a clutch piston 12 for applying a clutch pack 14 via a piston apply member 16. The clutch piston 12 is movable within a clutch cylinder 18 against a clutch return spring 20 when pressurized fluid is injected into the apply chamber 22 of the clutch cylinder 18 to force the clutch piston 12 to the right, as viewed in FIG. 1, for applying the clutch pack 14.

The apply chamber 22 is in fluid communication with the first portion 24 of the fill oil chamber 26 via the first passage 28. The second portion 30 of the fill oil chamber 26 is separated from the first portion 24 by the fill piston 32. The second portion 30 of the fill oil chamber 26 is in fluid communication with the second passage 34. The second passage 34 may be selectively communicated with the exhaust port 36 or the line pressure port 38, depending upon the position of the fill control valve 40. The exhaust port 36 is operative to communicate oil expelled from the second portion 30 of the fill oil chamber 26 to the oil pan or sump. The line pressure port 38 is in fluid communication with a transmission line or common gallery of a transmission assembly in which the clutch control apparatus if positioned. The transmission line carries pressurized oil at a "line pressure" which is the base operating pressure for the transmission which operates the hydraulic components of the transmission, as is well known in the art. A secondary exhaust port 42 is provided for draining any oil which leaks past the fill control valve 40.

The third passage 44 is in fluid communication with the first passage 28 through the orifice 46. The orifice 46 is sized to allow only enough flow of oil into the first passage 28 to compensate for leaks at the highest apply pressure for the clutch, plus a small amount to complete the fill and provide a safety margin when the third passage 44 is active. The orifice 46 is preferably between approximately 1 mm and 3 mm in diameter. The third passage 44 is selectively communicable with the exhaust port 36 or the fourth passage 48 which is in communication with the controllable source of pressurized fluid 50. The controllable source of pressurized fluid 50 may be a variable bleed solenoid, a force motor, a hydraulic regulating valve, or any suitable pressure control system which provides real time pressure control.

The fill oil chamber 26 is sized to hold the volume of oil required to fill the clutch apply chamber 22, plus a safety margin. The fill oil chamber 26 is preferably below the lowest sump level 52 of the transmission.

The fill piston 32 is configured to block the exit path of the fill oil in the first portion 24 of the fill oil chamber 26 at the bottom on its stroke.

The pre-load spring 54 on the fill control valve 40 is sized to keep the valve in the idle position until the pressure from the controllable source of pressurized fluid 50 rises to a value near that of the clutch return spring 20 pressure.

A snubber 56 is formed in the bottom on the fill oil chamber 26 and corresponds with a complementary snubber shape 58 formed in the fill piston 32 to reduce the fluid mass flow rate into the clutch apply chamber 22 near the completion of fill in order to provide a smooth transfer of pressure control to the controllable source of pressurized fluid 50, as described below.

The idle mode (i.e., clutch disengaged) is represented in FIG. 1. In the idle mode, the "signal pressure" from the controllable source of pressurized fluid 50 is zero. The fill control valve spring 54 positions the fill control valve 40 so as to vent the fill pressure from the second passage 34 to the exhaust port 36, and to block the signal pressure from the fourth passage 48 from entering the third passage 44. The first portion 24 of the fill oil chamber 26 holds an amount of oil measured during the prior clutch release cycle to just fill the clutch apply chamber.

Figure 2:
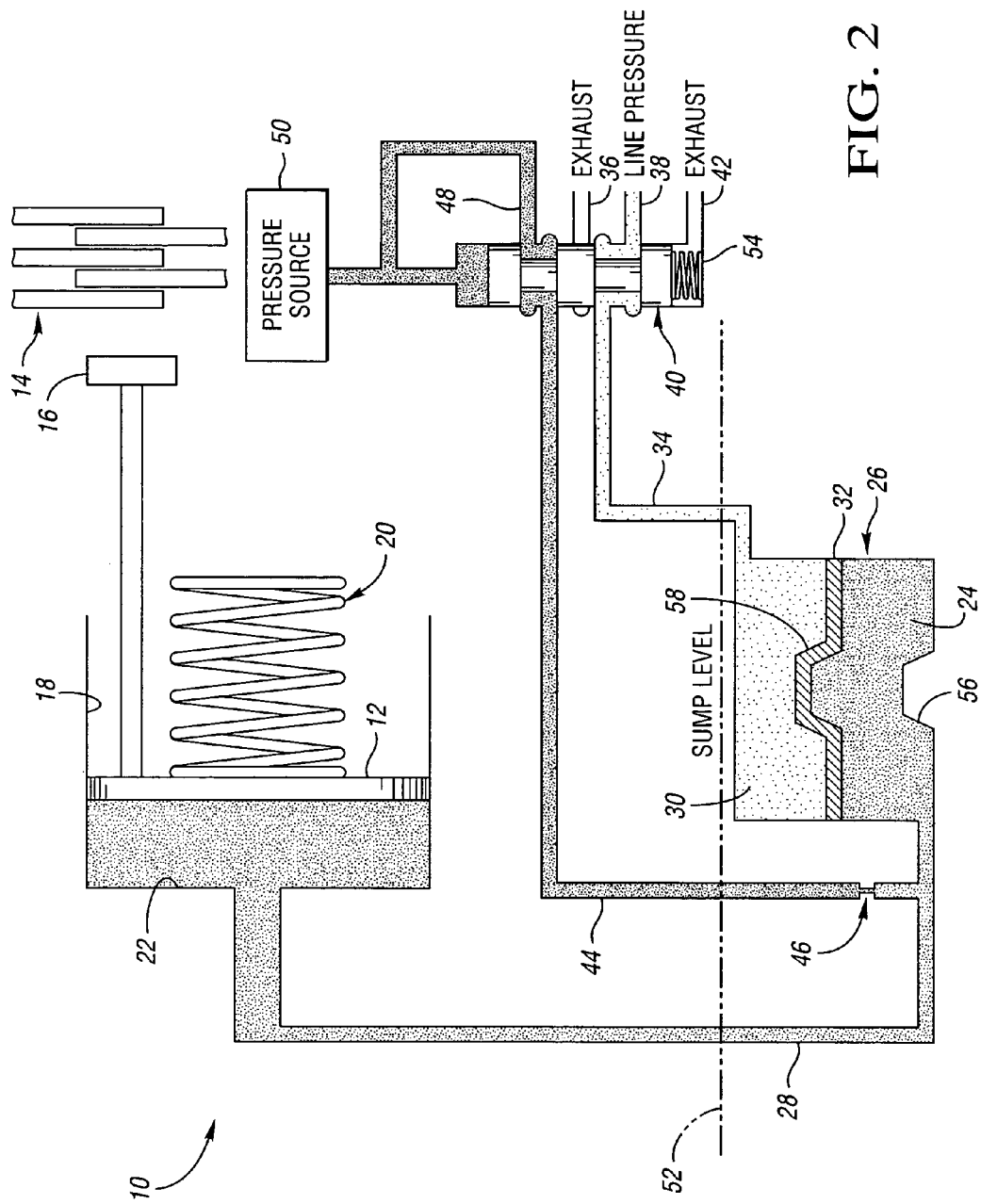
FIG. 2 shows a schematic illustration of the clutch control apparatus of FIG. 1, wherein the clutch is in the fill mode.

Turning to FIG. 2, in the fill mode (i.e., when the clutch is initiating engagement), the signal pressure from the controllable source of pressurized fluid 50 overcomes the pre-load spring 54 and moves the fill control valve 40. This applies line pressure from the line pressure port 38 to the second portion 30 of the fill oil chamber 26, which causes the clutch apply piston 12 to advance through its free running clearance rapidly as the fluid is moved from the first portion 24 of the fill oil chamber 26 into the apply chamber 22 by line pressure acting above the fill piston 32. As the fill piston 32 reaches the snubber 56, the mass rate of flow to the apply chamber 22 is smoothly reduced. As the clutch fill completes, the flow through the first passage 28 decreases to a level which compensates for the leak rate of the clutch piston 12. This allows the signal pressure from the controllable source of pressurized fluid 50 to begin controlling the clutch capacity. The fill piston 32 is now held at the bottom of its stroke, preventing apply pressure from bleeding back into the fill oil chamber 26 and line pressure from affecting apply pressure.

Figure 3:
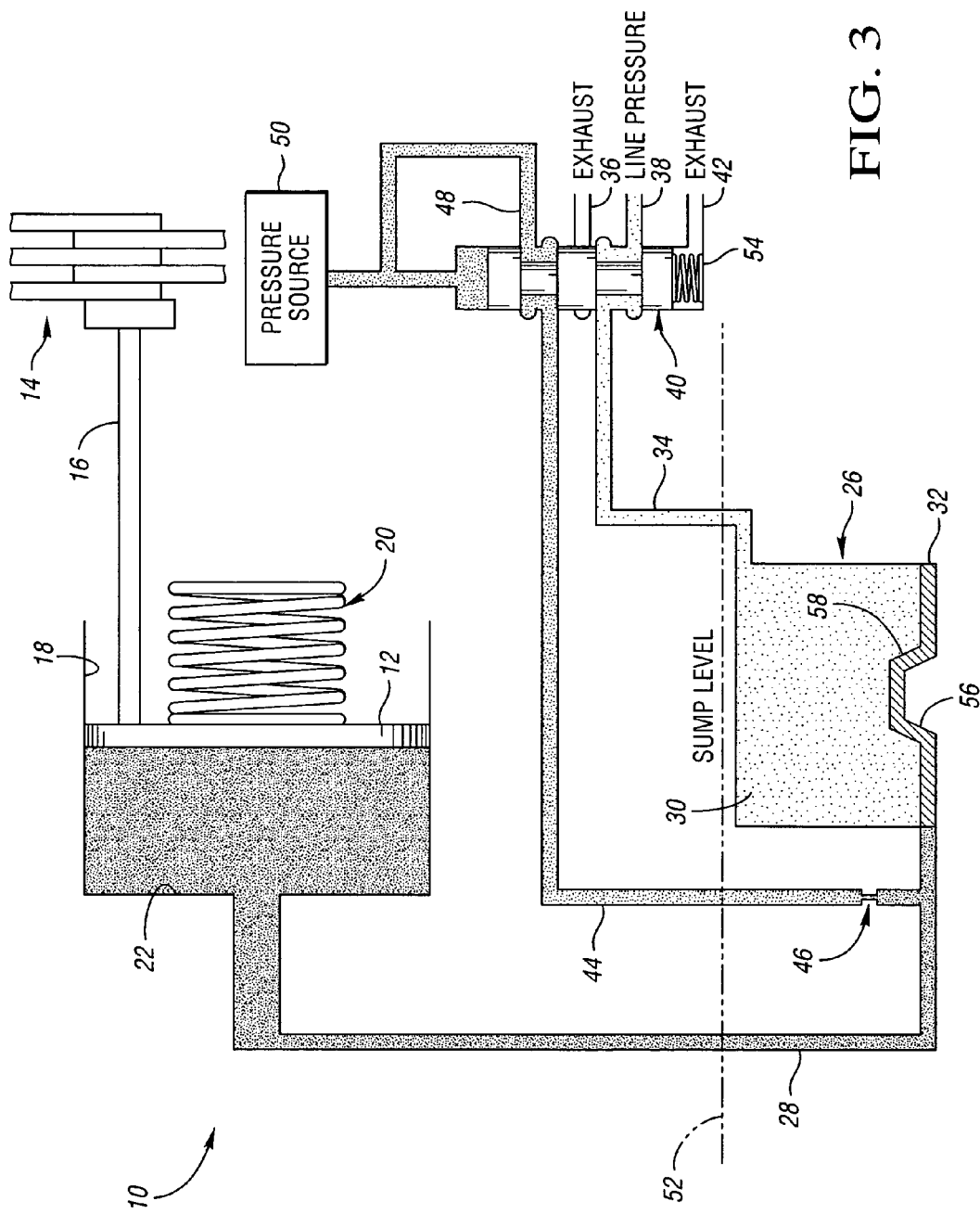
FIG. 3 shows a schematic illustration of the clutch control apparatus of FIGS. 1 and 2, wherein the clutch is in the pressure ramp mode.

Turning to FIG. 3, the pressure ramp mode is illustrated, wherein the clutch apply force is established. In the pressure ramp mode, the signal pressure from the controllable source of pressurized fluid 50 is the only device controlling the apply pressure within the apply chamber 22, thus allowing the normal force on the clutch to be under electronic control. This mode is active in apply, holding, and releasing the clutch by modulating its capacity.

Figure 4:
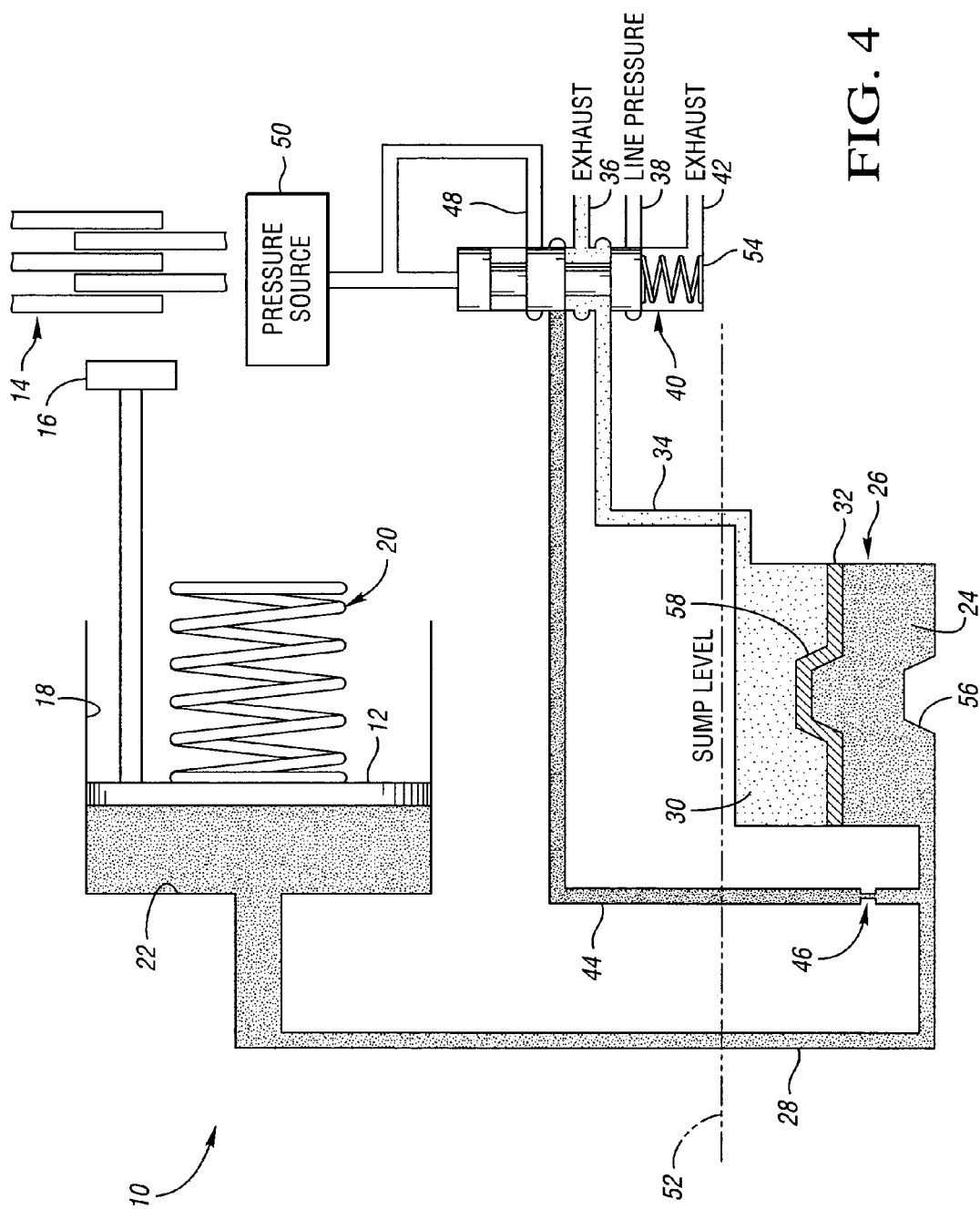
FIG. 4 shows a schematic illustration of the clutch control apparatus of FIGS. 1–3, wherein the apparatus is in the recover mode.

Turning to FIG. 4, the recover mode is illustrated. In the recover mode, after the clutch capacity has been reduced by reducing the signal pressure from the source of pressurized fluid 50 to its release point, the signal pressure from the controllable source of pressurized fluid 50 is reduced further until the force of the spring 54 acting on the fill control valve 40 exceeds the force of the signal pressure from the controllable source of pressurized fluid 50 on the opposite end of the valve 40. The fill control valve 40 then moves so as to block the line pressure port 38 and to communicate the second passage 34 with the exhaust port 36 to vent the fill pressure from the second portion 30 above the fill piston 32. The clutch return spring 20 causes movement of the clutch piston 12 to the left, as viewed in FIG. 4, to move just the volume of fluid required to destroke the clutch apply piston from the apply chamber 22 into the first portion 24 of the fill oil chamber 26. The first portion 24 of the fill oil chamber 26 thus contains the precisely measured volume of fluid needed to advance the clutch apply piston 12 rapidly to a position just short of the point at which the clutch clearance is fully taken up on the following apply stroke. In the event that the operator requests reapplication of the clutch before the apply piston 12 has fully returned to its idle position, the first portion 24 of the fill oil chamber 26 will contain a correspondingly smaller volume of fluid, again enabling fast, accurate refilling of the clutch apply chamber 22 without overfilling.

Accordingly, the invention specifically enables rapid and accurate reactuation of a partially destroked hydraulic cylinder due to the fact that the fluid volume of the first portion 24 of the fill oil chamber 26 will closely reflect the volume required in the apply chamber 22 to again position the piston very quickly to the position required to deliver capacity. This is particularly attractive in the case of a cancelled and recommanded cylinder apply with the clutch apply piston 12 may be at some indeterminate intermediate position between fully stroked and fully exhausted.

It is especially important to be able to rapidly deliver capacity in the case of a clutch-to-clutch downshift. Most commonly when such a shift is desired, the off going element is full of oil, and the oncoming element cylinder is voided and destroked to allow free running clearance of the friction elements. Thus, the desired capacity decay of the off going element can be affected very quickly, since mere reduction of the pressure command is sufficient to allow the engine speed to begin to rise without needing to move a significant amount of oil. However, with the prior art, the oncoming element cannot deliver capacity until the apply piston has advanced through the entire clearance distance. If the time required to deliver that volume of oil is long, the engine speed will flare above the desired synchronous speed in the lower ratio, resulting in a noisy, delayed, harsh and high energy shift. The present invention avoids this problem. The fast filling quality and robustness against unpredictable performance in the case of partial release followed by a reapply command, as enabled the present invention, are also very desirable in the control of dual input clutch transmission designs implementing pre-selection of various torque paths with alternating actuation of input clutches. The invention allows repeated partial actuations and releases with predictable accuracy and greatly reduced latency times due to its ability to overcome stroke delay.

The invention allows fast, reliable response of clutch-to-clutch shifting systems and dual input clutch shaft power transmission systems. The separation of the volume delivery portion of the circuit from the pressure regulating portion of the circuit is the key to the invention. Existing systems require learning, estimation, and accurate approximation of the required fill volume. Delivery of the clearance volume of fluid directly through regulating valves leads to slower response time due to the inevitable circuit restrictions and due to the longer settling times of high flow regulating valves transitioning from the stroking phase to the pressure regulating phase of operation. The traditional approach of a timed fill phase followed by a ramped pressure increase phase does not provide rapid response to accomplish desired delay times.

In summary, the invention enables rapid and accurate movement of a fluid power actuated piston to a position just sufficient to take up the free running clearance of the clutch but not to advance the piston so far as to affect significant normal force. Immediately after so positioning the piston, its normal force can be controlled by a regulating valve or variable force motor. The invention allows rapid response to demand by minimizing stroke time without decreasing pressure accuracy or repeatability. The good repeatability is a consequence of the storage of the measured returning volume upon deactivation of the actuator piston. Changes in the true volume of fluid required to stroke the piston may be due to production variability, wear over time, temperature variations, and other facts. The fluid volume delivered by the fast fill device of the present invention will closely match the volume exhausted on the prior actuation because the floating accumulator piston (fill piston 32) idle position is determined by that volume.

While the best mode for carrying out the invention has been described in detail, those familiar with the art to which this invention relates will recognize various alternative designs and embodiments for practicing the invention within the scope of the appended claims.

The invention claimed is:

1. An apparatus for applying and releasing a clutch piston in a clutch cylinder, the apparatus comprising:
    a fill oil chamber having first and second portions separated by a fill piston, said first portion being a fluid communication with the clutch cylinder through a first passage, and said second portion being in fluid communication with a second passage; wherein said fill oil chamber is positioned below the lowest sump level of a transmission in which the apparatus is positioned;
    a third passage in fluid communication with the first passage; and
    a fill control valve operative to alternately communicate the second passage to a transmission line pressure passage or an exhaust passage, and further operative to alternately communicate the third passage to a controllable source of pressurized oil having a signal pressure separate from said transmission line pressure or to close the third passage.

2. The apparatus of claim 1, wherein said fill control valve comprises a double spool valve biased by a spring.

3. The apparatus of claim 1, wherein said third passage is connected to the first passage through an orifice.

4. The apparatus of claim 1, further comprising a snubber formed in the fill oil chamber to cushion movement of the clutch piston when applying the clutch piston.

5. The apparatus of claim 1, wherein the apparatus is operative to switch between application of line pressure or signal pressure to the clutch piston to cause a rapid, controlled application and release of the clutch piston.

6. A method for applying and releasing a clutch piston in a clutch cylinder, the method comprising:
    providing a source of transmission line pressure;
    providing a controllable source of pressurized oil having a signal pressure separate from said transmission line pressure; and
    alternately communicating the clutch cylinder with the source of transmission line pressure and the controllable source of pressurized oil to control application and release of the clutch piston; wherein said step of alternately communicating comprises, when applying the clutch piston, communicating said source of transmission line pressure with the clutch cylinder via a fill piston until the fill piston bottoms out, and then communicating said controllable source of pressurized oil to the clutch cylinder to cause a smooth, controlled clutch application.

7. The method of claim 6, further comprising controlling said controllable source of pressurized oil to control the normal force on a clutch pack applied by the clutch piston during applying, holding and releasing of a clutch.

8. A method for applying and releasing a clutch piston in a clutch cylinder, the method comprising:
    providing a source of transmission line pressure;
    providing a controllable source of pressurized oil having a signal pressure; alternately communicating the clutch cylinder with the source of transmission line pressure and the controllable source of pressurized oil to control application and release of the clutch piston; wherein said step of alternately communicating comprises, when applying the clutch piston, communicating said source of transmission line pressure with the clutch cylinder via a fill piston until the till piston bottoms out, and then communicating said controllable source of pressurized oil to the clutch cylinder to cause a smooth, controlled clutch application;
    controlling said controllable source of pressurized oil to control the normal force on a clutch pack applied by the clutch piston during applying, holding and releasing of a clutch; and
    reducing pressure of said controllable source of pressurized oil to enable a spool valve spring to move a spool valve to exhaust pressure from the clutch cylinder and allow a clutch return spring to move oil from the clutch cylinder to a fill oil chamber to be available for the next apply stroke.

9. A method for applying and releasing a clutch piston in a clutch cylinder, the method comprising:
    providing a source of transmission line pressure;
    providing a controllable source of pressurized oil having a signal pressure separate from said transmission line pressure;
    communicating said source of transmission line pressure with the clutch cylinder via a fill piston until the fill piston bottoms out;
    thereafter communicating said controllable source of pressurized oil to the clutch cylinder to cause a smooth, controlled clutch application; and
    controlling said controllable source of pressurized oil to control the normal force on a clutch pack applied by the clutch piston during applying, holding and releasing of the clutch pack.

* * * * *